Aug. 30, 1949.    G. H. STEUER    2,480,203
UNIVERSAL ELBOW FOR TRANSMISSION LINES
Filed May 28, 1947
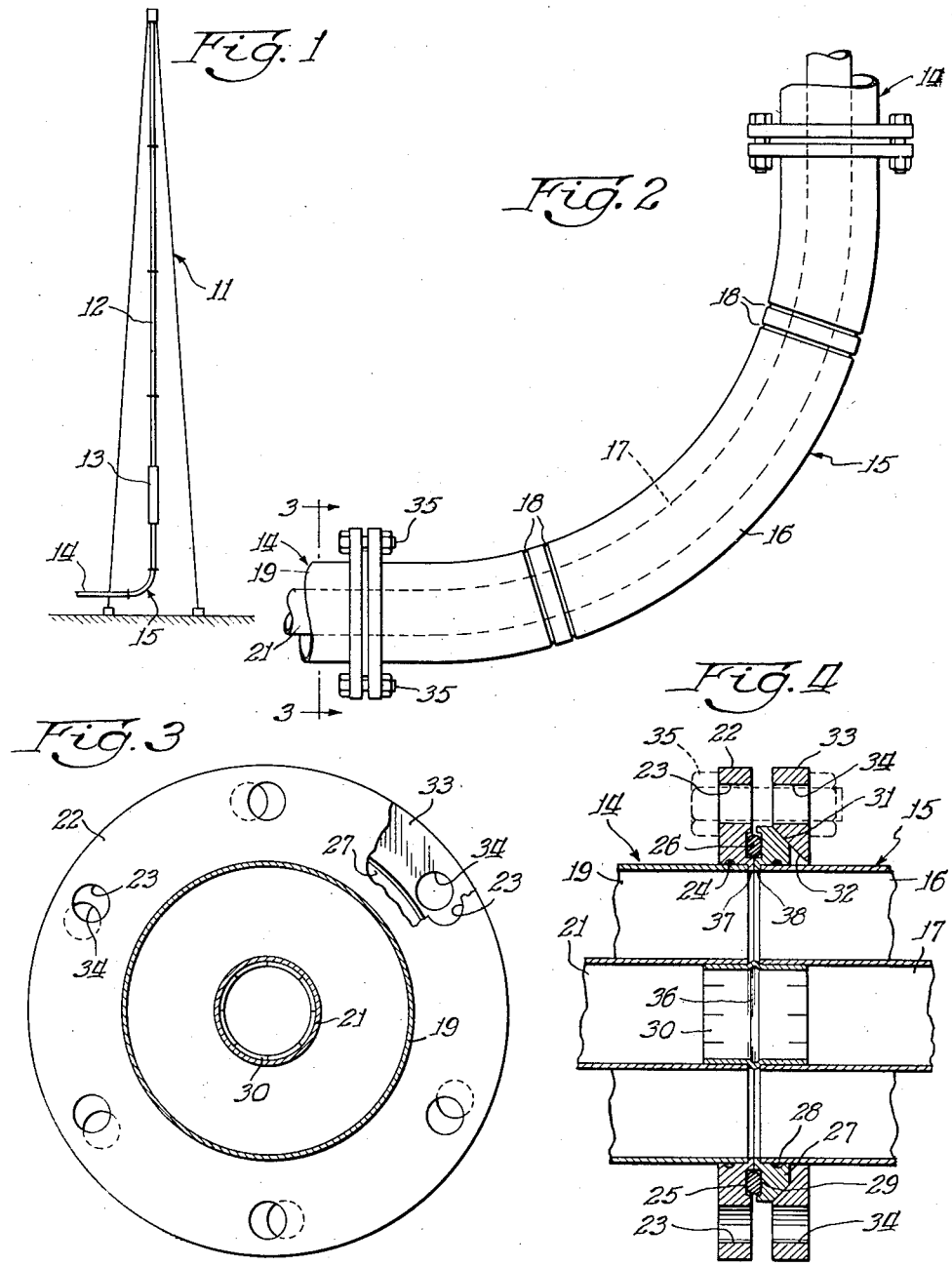
Inventor:
Gustav H. Steuer
By: Alois W. Graf
    Atty.

Patented Aug. 30, 1949

2,480,203

UNITED STATES PATENT OFFICE 2,480,203

UNIVERSAL ELBOW FOR TRANSMISSION LINES

Gustav H. Steuer, Chicago, Ill., assignor to Andrew Co., Chicago, Ill., a partnership Application May 28, 1947, Serial No. 751,061

3 Claims. (Cl. 285—22)

The present invention relates to a universal elbow for coaxial conductor transmission lines.

In the construction of coaxial transmission lines, and more particularly between the transmitter house and the antenna, it is necessary to employ elbows. Not infrequently certain portions of the transmission line are relatively fixed as for example the portion of the transmission line in the antenna tower. Coaxial conductor transmission lines are formed in sections which terminate in flanges which are bolted together with a gasket there between to insure a gas tight seal. Heretofore it has been necessary to drill holes in the flange of the elbow at the place of installation in order to properly connect one end of the elbow to the relatively fixed transmission line. This operation is not only expensive, but occasionally an improper installation is made due to failure of properly aligning the drilled holes with the holes in the flange of the straight section of the transmission line. It, therefore, would be desirable to provide an arrangement whereby the drilling of holes in the field may be avoided. This is accomplished in accordance with the present invention by providing a transmission line elbow having a fixed flange portion for cooperating with the sealing gasket and a rotatable flange portion whereby the holes therein may be aligned with the holes in the fixed flange of the adjoining transmission line section.

It, therefore, is an object of the present invention to provide an improved elbow for coaxial transmission lines which may be mounted in position without the necessity of drilling holes or making other adjustments.

Other and further objects of the present invention subsequently will become apparent by reference to the following description taken in conjunction with the accompanying drawings wherein:

Figure 1 is a diagrammatic representation showing the manner in which the present invention is employed to interconnect horizontal and vertical transmission lines at a transmitter tower;

Figure 2 is a plan view of the invention;

Figure 3 is an end view as seen in the direction of the arrows along the line 3—3 of Figure 2; and Figure 4 is a cross sectional view through the lower flange connection shown in Figure 2.

Referring to the drawings, there is shown in Figure 1 a typical installation of the present invention where a radio transmitter tower 11 has a vertical transmission line 12 which may include an expansion joint section 13. A horizontal transmission line 14 leads from the antenna tower 11 to the transmitter house. An elbow 15 interconnects the transmission line sections 12 and 14.

The elbow 15 has an outer conductor 16 and an inner conductor 17. The inner conductor 17 is supported in position by suitable insulators which are held in position by inwardly rolled or crimped portions 18. The inner conductor 17 is connected to the inner conductor 21 of the transmission line 14, and the outer conductor 16 is connected to the outer conductor 19 of the transmission line 14. The end of the transmission line 14 is provided with a flange 22 having a plurality of holes 23 arranged at equal intervals around the flange. The flange is usually secured to the end of the outer conductor 19 by soldering and hence the inner opening of the flange 22 may be provided with a suitable groove for accommodating the solder 24, a portion of which when heated flows between the outer conductor 19 and the flange 22 to provide a sweated joint. The end surface of the flange 22 is provided with a recess or annular groove 25 against which is placed a sealing ring 26 which more commonly is made of rubber having a circular cross-section.

The elbow 15 adjacent its end has an annular ring 27 which is retained in position by solder 28 placed within a groove similar to the groove in the flange on the transmission line 14. The flange 27 has a recess or annular groove 29 which is adapted to engage and retain in position the rubber ring 26. The annular ring 27 has a bearing surface 31 which is engaged by a bearing surface 32 on a fastening flange 33. The fastening ring 33 is provided with a plurality of holes 34 which are adapted to be aligned with the holes 23 of the flange 22 so that suitable bolts 35 may be inserted therein for holding the joint in position. In order to interconnect the inner conductors 17 and 21 of the elbow 15 and the line 14 respectively there is provided a connector 30 of slightly smaller diameter than the inside of the inner conductors 17 and 21. Preferably the connector 30 is provided with a rolled bead 36 which limits the amount or distance which the connector 30 may be inserted into either one of the conductors. The peripheral portions of the ends of the connector 30 are preferably slotted so that the resilient finger-like portions formed thereby may make a positive electrical contact. Positive electrical contact is made between the outer conductors 16 and 19 by virtue of the contact between the stepped portions 37 and 38 of the annular rings 22 and 27 respectively. Each of these rings not only engages the outer periphery of the outer conductors, but also engages the end thereof, thereby positively positioning the ring so that it is possible to connect together sections of the transmission line including an elbow so as to provide a gas tight seal. The connection furthermore also provides positive electrical contact so as to insure electrical continuity throughout the transmission line.

From the representation shown in Figure 3 it will be noted that the holes 23 and 34 of the two flanges may be aligned by rotation of the member 33. The representation shown in Figure 3 illustrates quite clearly the situation frequently encountered where one section of a transmission line which is relatively fixed is to be connected to another section of a transmission line which is being laid between some distant points and the fixed transmission line. This occurs not only at the antenna tower but also at other places where the transmission line has to change direction.

From the foregoing it will be seen that the annular ring 27 and the cooperating fastening ring 33 have inclined cooperating and complementary surfaces 31 and 32. Obviously, other forms of complementary bearing surfaces may be employed such as a stepped surface or a plain surface arranged parallel to the end of the transmission line section for engagement by a cooperating parallel surface of the fastening ring.

While for the purpose of illustrating and describing the present invention, a preferred embodiment has been illustrated in the drawings, it is to be understood that the invention is not to be limited thereby since such variations in the construction and in the instrumentalities employed therein are contemplated as being commensurate with the spirit and scope of the invention set forth in the following claims.

What I desire to protect by United States Letters Patent is claimed as follows:

1. A coupling unit for interconnecting two sections of a coaxial transmission line each having at the ends thereof an annular flange abutting the end of the section and surrounding the outer end portion thereof, said sections arranged at an angle to each other said flange being provided with circumferentially spaced holes, comprising a coaxial conductor elbow having at one end thereof an annular flange abutting the end of said conductor and surrounding the outer end portion thereof, said flange being provided with a bearing surface inclined to the plane of said flange, and an annular ring arranged for movement about said conductor and having a bearing surface inclined to the plane of said ring for engagement with the inclined surface of said flange, said ring being provided with circumferentially spaced holes, each of said flanges being provided on the forward face thereof with an annular groove for receiving a packing ring of resilient material.

2. A coupling unit for interconnecting two sections of a coaxial transmission line each having at the ends thereof an annular flange rigidly secured thereto, said flange abutting the end of the transmission line section and surrounding the outer end portion thereof and having circumferentially spaced holes, said sections being at an angle to each other comprising a coaxial conductor elbow having at the end thereof an annular flange abutting the end of said conductor and surrounding the outer end portion thereof, said annular flange being rigidly secured to said conductor and being provided with a bearing surface inclined to the plane of said flange, said flange at the forward face thereof having an annular groove for receiving a packing ring of resilient material having a circular cross-section, and an annular ring having a bearing surface inclined to the plane of said ring for engagement with the inclined surface of said flange, said ring being provided with circumferentially spaced holes.

3. A coupling elbow for interconnecting two sections of a coaxial transmission line arranged at an angle therebetween comprising a coaxial conductor having at one end thereof an annular flange, provided with a bearing surface inclined to the plane of said flange, said flange on the forward face thereof having an annular groove for receiving a packing ring, and an annular ring arranged to be rotatable about said conductor and having a bearing surface inclined to the plane of said ring for engagement with the inclined surface of said flange, said annular ring being provided with circumferentially spaced holes adapted to be aligned with holes in the flange of an adjacent section of coaxial transmission line.

GUSTAV H. STEUER.

REFERENCES CITED

The following references are of record in the file of this patent:

UNITED STATES PATENTS

| Number | Name | Date |
| --- | --- | --- |
| 2,090,497 | Brown | Aug. 17, 1937 |
| 2,122,071 | Rasmussen et al. | June 28, 1938 |
| 2,157,885 | Bailey | May 9, 1939 |
| 2,335,040 | Bruno | Nov. 23, 1943 |